L. M. BOLLES & W. G. SMITH.
CAMERA BOX.
No. 16,637.  Patented Feb. 17, 1857.
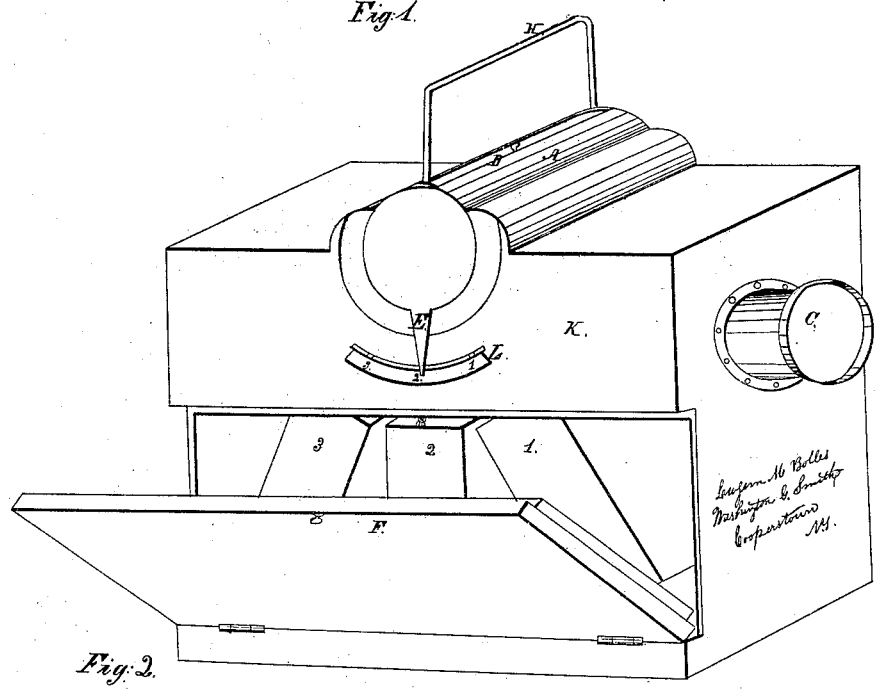
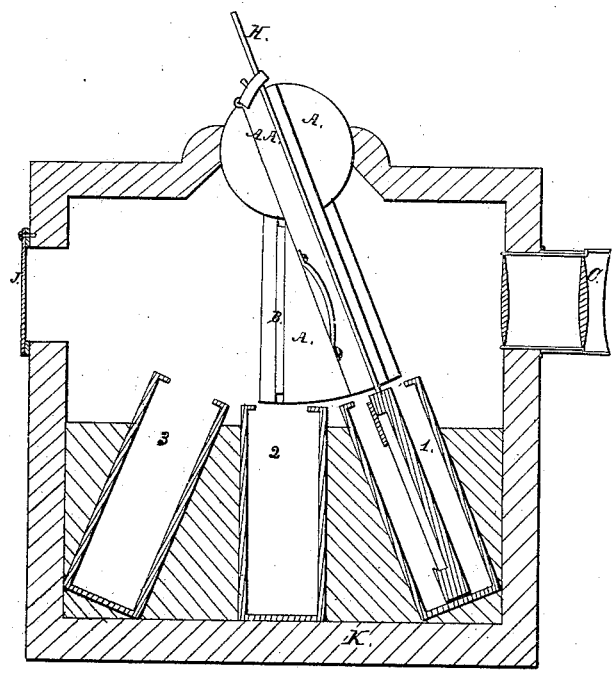
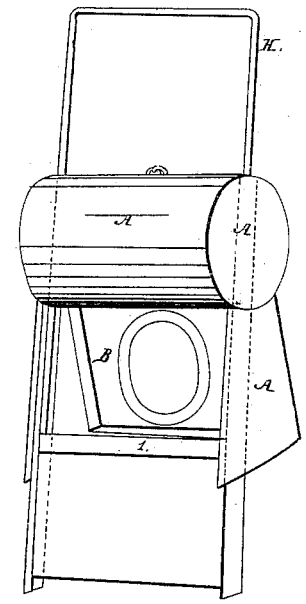

UNITED STATES PATENT OFFICE.

L. M. BOLLES AND W. G. SMITH, OF COOPERSTOWN, NEW YORK.

PHOTOGRAPHIC-CAMERA BOX.

Specification of Letters Patent No. 16,637, dated February 17, 1857.

*To all whom it may concern:*

Be it known that we, LUZERNE M. BOLLES and WASHINGTON G. SMITH, of Cooperstown, in the county of Otsego and State of New York, have invented a new and useful Improvement in Camera-Boxes for Taking Photographic Impressions; and we do hereby declare that the following is a full, clear, and exact description of the same, reference being had to the accompanying drawings, forming part of this specification, in which—

Figure 1, is a perspective view, showing the camera box, swing frame, baths, and indicator, ready for use, with the exception that the door in the side of the camera box is open. Fig. 2 is a sectional side view of Fig. 1, showing the ground glass as permanently attached to the swing frame; also a mortise and grooves through the spring frame, to receive the sliding plate holder which carries the plate into the baths. Fig. 3 is a perspective view of the swing frame, with the ground glass and plate holder.

This invention consists in a novel arrangement for the ground glass, and plate holder to operate in a camera box with an indicator on the outside of the camera box, showing their positions. By the use of this swing frame in a camera box, the ground glass is not removed in operating; it swings back to a stop, and the mortise and grooves come to corresponding position of the ground glass, ready to receive the plate holder, and after the plate has received the light, it will swing to corresponding angles of the baths, to admit the sliding of the plate into the same to perfect the impression; or the plate holder may be withdrawn, and carried to a dark room, for the impression to be developed in the usual way.

To enable those skilled in the art, to make and use our invention, we will proceed to describe its construction and operation.

Similar letters of reference indicate corresponding parts in the several figures.

This invention consists in a swing frame, with a ground glass permanently attached, and arranged with a mortise and grooves to admit the plate holder, it being applied to the camera box in the place of a door; after getting the proper focus on the ground glass, this frame will swing back, and the mortise and grooves holding the plate holder will come to the exact point of the focus of the object. The swinging frame, baths, camera box and plate holder, each to perform their respective functions.

This invention may be constructed of wood, or other suitable materials.

A, in Figs. 1, 2, and 3 is a swinging frame.
B, in Figs. 2 and 3 is a ground glass.
A, A, in Fig. 2 is a mortise and grooves.
D, in Figs. 1 and 2 is a door in swinging frame; E, is an indicator, showing the position of the ground glass and plate holder; F is a door in the side of the camera box to admit the baths. Nos. 1, 2, and 3 are baths, holding the different chemicals in position. No. 1, is a nitrate of silver bath; No. 2 is a water bath; No. 3 is a developing bath.

I, in Figs. 2 and 3 is a plate holder.
J in Fig. 2 is a slide door in the back of the camera box; K, is a camera box; L is a dial for indication.

In order to operate this invention, place the indicator E, to Fig. 1 on the dial L, which will bring the ground glass to its proper place; adjust the focus on the ground glass; place the prepared plate in the plate holder H; slide it in the mortise and grooves A, A, into bath No. 1; let it remain three minutes; close up the lens with cap C; and close camera box with door J; withdraw the plate from bath No. 1, into the swinging frame A; turn the indicator to Fig. 2 on the dial; remove the cap C, so as to admit the reflected light on the plate; replace cap C; turn the indicator to Fig. 3 on the dial; slide the plate holder into the corresponding bath; let it remain from 5 to 40 seconds, according to the strength of the solution; withdraw again into the swinging frame; turn the indicator to Fig. 2 on the dial; and slide the plate into bath 2, so as to rinse well in the water, before exposing the impression to the light; then withdraw the plate holder from the swinging frame; remove the plate, and immerse it in a bath or pan, holding the fixing solution; rinse with water and the impression is ready to dry. We also intend to apply this swinging frame to common camera boxes now in use, which can be done by removing the door off of the top of the box, and placing this frame in its place; and operate with the indicator and dial, the same as described, in forming the object on the plate, then remove the plate holder to a dark room, for the impression to be developed in the usual way.

What we claim, and desire to secure by Letters Patent, is—

1. A swinging frame A, with ground glass permanently attached, as described and set forth, for the purpose specified.

2. The arrangement of the baths in the camera box to correspond with the operations of the plate holder, through the mortise and grooves, as set forth and described.

LUZERNE M. BOLLES.
WASHINGTON G. SMITH.

Witnesses:
C. J. STILLMAN,
CYRUS LEWIS.